United States Patent [19]
Robinson

[11] 4,094,337
[45] June 13, 1978

[54] PRESSURE REGULATOR VALVE

[75] Inventor: Alfred D. Robinson, El Monte, Calif.

[73] Assignee: Delphi Instruments, Inc., South El Monte, Calif.

[21] Appl. No.: 670,668

[22] Filed: Mar. 26, 1976

Related U.S. Application Data

[63] Continuation-in-part of Ser. No. 516,024, Oct. 18, 1974, abandoned.

[51] Int. Cl.² .................................................. F16K 31/12
[52] U.S. Cl. ................................. 137/505.42; 251/368
[58] Field of Search ..................... 137/505.42; 251/368

[56] References Cited

U.S. PATENT DOCUMENTS

| | | | |
|---|---|---|---|
| 2,065,087 | 12/1936 | May | 137/505.42 X |
| 2,192,141 | 2/1940 | McElwaine | 251/321 X |
| 2,342,659 | 2/1944 | Grove | 137/505.42 |
| 2,716,421 | 8/1955 | Bertrand | 251/368 X |
| 2,854,021 | 9/1958 | Baldwin | 251/368 X |
| 2,918,930 | 12/1959 | Jansen | 137/505.42 X |
| 3,044,486 | 7/1962 | Miller | 137/505.42 |
| 3,160,391 | 12/1964 | Medicus | 251/368 X |
| 3,348,573 | 10/1967 | Bradford | 137/505.42 X |
| 3,391,901 | 7/1968 | Wheeler | 251/368 X |
| 3,559,662 | 2/1971 | Iezzi | 251/368 |

Primary Examiner—Harold W. Weakley
Attorney, Agent, or Firm—Edward J. DaRin

[57] ABSTRACT

A pressure reducing valve particularly constructed for use with hot high pressure water by the incorporation therein of a sapphire valve head, seat and head engaging element.

4 Claims, 3 Drawing Figures

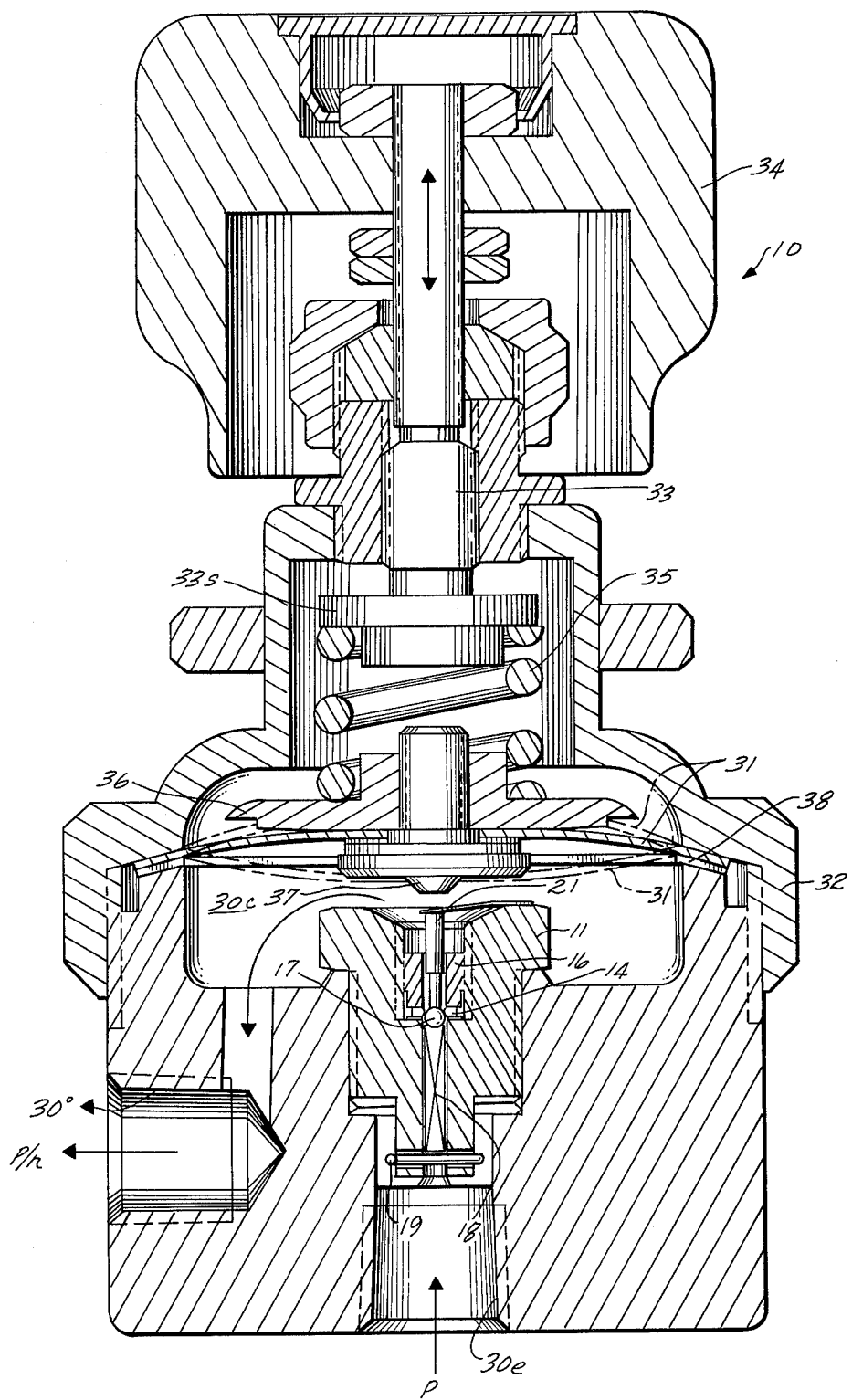

PRESSURE REGULATOR VALVE

CROSS-REFERENCE TO RELATED APPLICATIONS

This application is a continuation-in-part of the earlier filed application bearing Ser. No. 516,024, filed Oct. 18, 1974, now abandoned and assigned to the same assignee as the present application.

This invention relates to a pressure reducing valve particularly adapted for use with high pressure water.

At the present time there is a need for a suitable valve for sampling of water from high pressure boilers. In order to sample water from high pressure boilers, some means for getting a relatively small flow of water from water within the range of 3500 psig and 1200° F. down to 50 psig and 70° F. is required. To obtain the cooling of the water is not a difficult problem but reducing the pressure of the water sample has produced many approaches, none of which to date appear to be commercially acceptable or have limited valve life. These approaches include various elaborate techniques for reducing the water pressure. The prior art approaches have produced a pressure drop across capillary orifices of various configurations. Due to the small spacings of the capillaries, they become easily plugged or restricted in fluid flow and are not self-adjusting in response to the flow rates or pressure changes of the water applied thereto. Pressure reducing regulators for gas that meet above specifications are presently available that are satisfactory. There are no pressure reducing regulators commercially available for use with water sampling that are satisfactory. Accordingly, there is a present need for a pressure regulator that will maintain a reasonable pressure downstream of the valve for input pressure fluctuations to the valve from 1,000 to 4,000 psig and flow rates from 500 to 2000 cc/min. Under these conditions, reasonable pressures downstream are on the order of 20–50 psig.

One of the problems with respect to the present day pressure reducing regulators for use with high pressure water is that under high pressure the valving elements are destroyed in a very short time. In such high pressure boiler applications, for example, pressure reducing valves have employed stainless steel and fancy alloys like Steatite and carboloy. Such pressure reducing valves employing carboloy (tungsten carbide) for the valve seat have been found to last only a few hours. In order to overcome the limited life of such valve elements, more elaborate valve designs have evolved that produce the desired pressure drop in a number of steps in an attempt to prolong the life of such valves. This type of approach to valve design results in valves that need large travels for the movable elements of the valve which presently are not compatible with the desire for self-contained regulators. These more elaborate designs have extended the life of the pressure reducing valves to a certain extent but are still not satisfactory.

In order to produce a pressure reducing valve that will maintain a reasonable pressure downstream for the fluctuations and input pressures that exist in sampling water from high pressure boilers, a material is required that will stand up under these severe operating conditions and be harder than presently used materials such as tungsten carbide, for example. A material that is unique among materials for its hardness, strength and chemical inertness is sapphire. Sapphire is exceeded in its hardness by only a few exotic materials and by diamonds. Sapphire has been found to not only have the requisite hardness but also the structural strength and chemical inertness required for such water reducing valves but also has exhibited little evidence of wear or deterioration. Various attempts have been made to employ sapphire in various prior art products including in valve structures. There is no known water pressure reducing valve, however, that incorporates materials such as sapphire and equivalents for the critical valve elements for a pressure reducing structure in which the physical properties of sapphire are taken advantage of. Specifically, the use of a sapphire fluid control element in conjunction with a sapphire seat has been found to be satisfactory and exhibits not only the necessary structural hardness and strength but also chemical inertness to eliminate any lack of corrosion or abrasion resistance found in prior art pressure reducing valves. The use of a sapphire material for these purposes is also relatively inexpensive relative to materials that may have equivalent physical characteristics and costs are comparable to the cost of carboloy elements, i.e., a 1/16 inch diameter sapphire ball at the present time costs on the order of 25 cents each.

The present invention provides an improved and relatively inexpensive pressure reducing valve that is particularly adapted for sampling water from high pressure boilers and has an extended life not heretofore achieved by any known commercially available pressure reducing valve employed in high pressure water applications. The valves may be employed in such environments without any evidence of wear or deterioration over a long interval of time so as to substantially extend the life of such valves long beyond those heretofore available for such applications.

From a structural standpoint, the present invention provides an improved valve assembly for use in a pressure regulating valve or the like used in high pressure boiler applications. The valve assembly includes a valve body having a stepped bore defining the fluid flow path therethrough. An apertured fluid control element seat is mounted against the inner wall of the stepped fluid passage bore with a fluid control element arranged in the bore on the opposite side of the inner wall for coaction with the seat. The seat aperture is sized to restrict the movement of the flow control element beyond the apertured seat. The fluid control element and the coacting seat are constructed of a hard, structurally strong material that is chemically inert to the flow of water conveyed by it. In one particular application, this element is constructed of sapphire. Means of clamping the fluid control seat against the inner wall of the fluid bore is provided with the clamping means having a longitudinal flow aperture arranged coaxially with the fluid flow bore. Means are mounted in the longitudinal fluid aperture for biasing the fluid control element away from the inner wall of the bore. Means are also mounted in the bore for normally maintaining the fluid control element in opposed relationship to the resilient biasing means on the other side of the wall so that the valve is normally open a preselected amount.

These and other features of the present invention may be more fully appreciated when considered in the light of the following specification and drawings, in which:

FIG. 2 is a longitudinal, cross section view of the valve illustrated in FIG. 1 and embodying the present invention;

Figure 1:
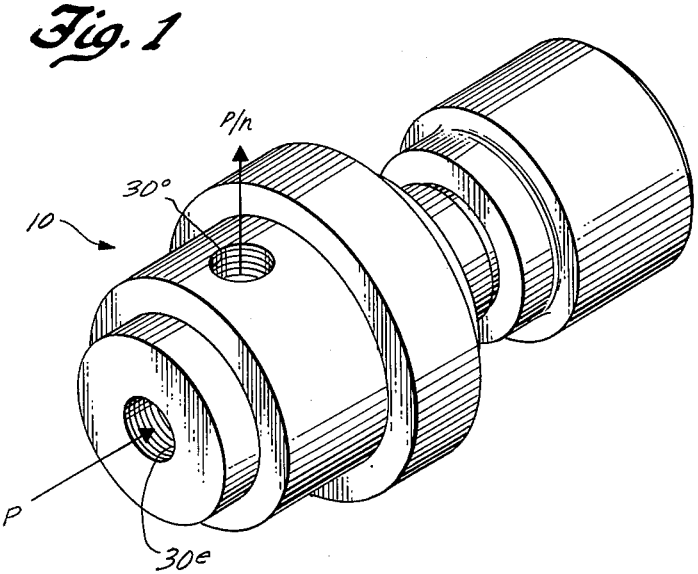
FIG. 1 is a perspective view of the improved pressure regulating or reducing valve of the present invention.

The disclosure of the present invention is directed to an improvement in a pressure regulator for producing reduced output pressures relative to the input pressures of the fluid applied to the valve. Such series pressure regulators are presently commercially available on the market for use with both gases and liquids. One such commercially available pressure regulator is identified as the HIR 100 series pressure regulator available from the Veriflow Corporation of Richmond, Calif. Such pressure regulators allow the output fluid pressure to be controlled by manually adjusting a control mechanism including a diaphragm for enclosing the fluid outlet chamber of the pressure regulating valve. The present invention incorporates an improved valve assembly for use in such a pressure regulator and employs the basic prior art structure for manually controlling the outlet pressure ranges from the valve. As is indicated in FIG. 1, the input pressure to such a pressure reducing valve 10 is P with the output pressure being $p/n$ when there is a flow limiting device downstream of the valve 10.

The output pressure $p/n$ can be controlled to fall within the range of 20-50 psig and down to 50 psig pressures. The structure of the improved valve 10 will allow flow on the order of 100-500 cubic centimeters per minute and will accept volumes on the order of liters per minute and provide satisfactory service.

Figure 3:
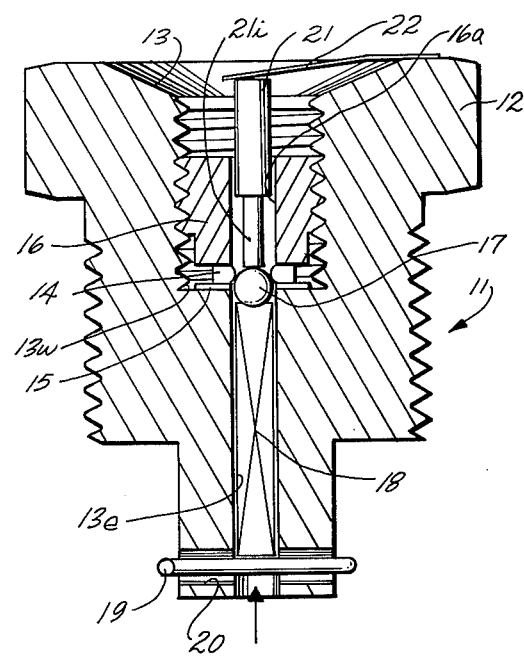
FIG. 3 is a longitudinal cross sectional view of the detached, valve assembly incorporated into the pressure regulating structure of FIG. 2.

The present invention, then, can best be appreciated by first examining the detailed construction of the valve assembly 11 incorporated into the pressure reducing valve 10 and can be best viewed by reference to FIG. 3, in particular. The valve assembly 11 is incorporated into the fluid entry passage of the valve 10 for controlling the flow of the fluid or the water through the pressure reducing valve 10. In considering the construction of the valve assembly 11 for high pressure water applications, it will be recognized that the materials that are exposed to the water must be selected to minimize any corrosion that is produced by water and similar corrosive liquids and gases that may be passed by the valve 10. To this end, the valve assembly 11 includes a valve body 12 that may be constructed of a stainless steel material. The valve body has a stepped bore 13 extending longitudinally therethrough. The stepped bore defines an inner wall 13w intermediate the ends of the valve body 12. The portion of the stepped bore 13 that is arranged inwardly of the inner wall 13w is of a relatively larger diameter than the diameter 13e which is arranged on the opposite side of the wall 13w and is the fluid entry passage for the valve assembly 11.

The valve structure comprises an apertured fluid control element seat 14 mounted against the inner wall 13w of the fluid passage bore 13 against a seat gasket 15 which is arranged between the wall 13w and the bottom face of the fluid control element seat 14. The fluid control element seat 14 and the gasket 15 are clamped to the bore wall 13w by the provision of a seat clamp screw 16 which has its outer periphery at least in part threaded for coaction with the threaded inner wall of the bore 13. When the seat clamp screw 16 is threaded into engagement with the fluid passage bore 13 as illustrated, it clamps the fluid control element 14 and its gasket 15 against the inner wall 13w. The seat clamp screw 16 is provided with a longitudinal aperture 16a that is arranged coaxially with the fluid bore 13. A fluid control element shown in the form of a ball 17 is mounted with the fluid control element seat 14 for coaction therewith. The ball 17 is maintained in position and continuously urged against the seat 14 by the provision of a spring 18 extending over a substantial portion of the inlet portion of the fluid bore 13. The flat side of the spring 18 is positioned against the ball 17 while the outer end of the spring 18 is secured by a wire 19 to the valve body 12 by being passed through an aperture 20 provided adjacent the fluid entry end of the bore 13 of the valve body 11 and has its ends bent to maintain the spring 18 in position against the ball 17. The opposite side of the ball 17 is continuously urged away from the seating element 14 by the provision of a valve pin 21 which is mounted in the longitudinal aperture 16a for the seat clamp screw 16. The valve pin 21, as illustrated in FIG. 3, has its inner end 21i of reduced diameter from its outer end and which end 21i engages the ball 17. The valve pin 21 is maintained in position against the ball 17 through the provision of a valve pin retaining strip 22 which is arranged in a cantilevered relationship with the valve body 12. The end of the retaining strip 22 may be welded to the valve body 12 with its free end continuously urging the pin 21 against the ball 17 and thereby keeps the pin 21 from falling out. The strip 22 has a very low spring constant to minimize any biasing action.

An important consideration of the present invention is the selection of the materials for the valve element for the fluid control element and the fluid control element seat to prolong the useful life of the valve 10. Because of the problems with prior art structures and the selection of materials that would appear to be satisfactory, such as tungsten carbide, and yet have not provided satisfactory service over long periods, materials for both the seat element 14 and the ball 17 should be constructed of a very hard, substantially strong material that is chemically inert to the flow of the water conveyed through the valve. For this purpose, it has been found important that both of these elements be constructed of the same material and sapphire has been found to be completely satisfactory and produces a valve that has a life heretofore unavailable in prior art pressure reducing valves. In the particular embodiment illustrated in FIG. 3, the apertured fluid control element 14 is shown in the form of a sapphire ring for coaction with a sapphire ball 17. To prevent the seat 14 from cracking when it is clamped to the face of the inner wall 13w, the gasket 15 should be selected of an inexpensive physically soft material to take up the irregularities of the wall 13w. The remaining materials selected for the spring 18 and similar elements may be stainless steel.

Although it was originally expected that completely satisfactory operation would result when the valving elements 14 and 17 for the valve 10 were constructed of a very hard, substantially strong, material that is chemically inert such as exhibited by sapphire, it was determined in the actual commercial operation of the valve 10 for its intended purpose that the actuating pin 21 had a relatively limited life when constructed of stainless steel. It was determined that when high velocity water rushed through the sapphire valving elements 14 and 17 that the coacting stainless steel actuating pin 21 had a relatively limited life as a result of being exposed to the water passing through the sapphire valving elements. It was therefore found that by the construction of the actuating pin 21 of a material exhibiting the same properties as sapphire or of sapphire, this material selection would extend the life of the valve 10 to render it completely satisfactory. In addition, the manufacturing cost of the valve 10 was reduced in substituting sapphire for stainless steel due to the lower cost of sapphire.

In the normal arrangement of the sapphire ring 14 and the sapphire ball 17, a preselected minimum amount of flow is allowed to pass through the fluid passage 13. This minimum normal flow may be on the order of 100–500 cc's per minute.

With the above structure of the valve assembly 11 in mind, the use of the valve structure in the pressure reducing valve 10 can now be better appreciated. The pressure reducing valve includes a valve body 30 having a fluid entry port 30e defined in the bottom wall of the body substantially centrally thereof. The fluid entry port 30e is arranged in communication with a fluid outlet chamber 30c which in turn communicates with the fluid outlet 30°. The valve assembly 11 is arranged in the fluid entry passage 30e inwardly of the fluid entry port and extends into the fluid outlet chamber 30c; see FIG. 2. The fluid flow through the valve 10 is by means of the fluid entry passage 30e, through the valve assembly 11 (the bore 13) the valve outlet chamber 30c and out of the valve 10 through the fluid outlet passage 30c. The upper portion of the fluid outlet passage 30c is enclosed by essentially prior art type structures including a diaphragm 31. This structure will be considered in more detail immediately hereinafter. Assuming for the present that the position of the diaphragm 31 is fixed and as a result the pin 37 carried by the diaphragm will be in contact with the valve actuating pin 21. The action of the valve assembly 11 in controlling the output pressure from the port of the fluid outlet passage is dependent on the pressure of the fluid downstream of the fluid outlet passage 30°.

Prior to the application of fluid pressure to the inlet P, the pin 37 deflects the valve actuating pin 21 as a result of the fixed position of the diaphragm 31. The movement of pin 21 deflects the ball 17 downward against the spring 18, opening annular orifice between the ball 17 and the seat 14.

Application of fluid pressure to inlet P will cause high flow rates of fluid through the valve if there is no flow limiting means downstream of the valve outlet 30°. In normal operation there will be an instrument with flow control valves or some other flow limiting valve downstream of the device described herein. Such flow limitation will cause a build up of pressure in chamber 30c causing the diaphragm 31 to be deflected upward and moving the pin 37 away from the valve actuating pin 21. The spring 18 can then move the pin 21 and the ball 17 to close down the annular orifice between the ball 17 and seat 14. This action continuously adjusts the annular orifice between ball 17 and seat 14 to maintain the downstream pressure essentially constant for changes in upstream pressure and for changes in the required flow downstream.

The outlet pressure from the valve 10 may be controlled in a more or less conventional fashion by controlling the position of the structure enclosing the upper section of the fluid chamber 30c. This control structure is mounted to the body 30 of the pressure regulating valve 10. The control structure is generally similar to that employed in the Veriflo Corporation HIR 100 pressure regulator. For this purpose, the structure includes a skirt 32 secured to the upper portion of the body 30 and mounting the diaphragm 31. The diaphragm 31 is sealed to the body 30 by the provision of a gasket 38. The position of the diaphragm 31 and thereby the pin 37 is controlled by means of movement of a control shaft 33 that is threaded and may be rotated by means of a control knob 34 secured thereto. The shaft 33 includes a spring seat 33s for seating the inner end of a tension spring 35 with the opposite end of the spring being seated against a spring seating element 36 of a generally inverted T-configuration. The element 36 is secured to the diaphragm 31. The arrangement allows the outer end of the spring seating element 36 to control the position of the diaphragm 31 by controlling the tension in the spring 35. As for the other elements of the pressure regulating valve 10, the diaphragm 31 should be constructed of a material consistent with the application for which the valve 10 is used. To this end, the diaphragm 31 may be constructed of a Teflon-lined stainless steel. It will now be appreciated that by rotating the knob 34, the position of the diaphragm 31 can be urged towards the valve assembly structure 11 or away from it in accordance with the direction of rotation. The outlet pressure from the outlet passage 30° can then be controlled to be a submultiple of the input pressure P in accordance with the position of the diaphragm 31 selected by the rotation of the knob 34 and the downstream fluid pressures that prevail.

It should now be appreciated by those skilled in the art that the present invention has disclosed an improved self contained pressure regulator having an improved valve assembly structure therein leading to an exceptionally long life with respect to the valves presently commercially available, particularly for sampling high pressure water in high pressure boiler applications.

What is claimed is:

1. A water pressure regulator comprising
    a body having a water inlet passageway, a water outlet chamber communicating with the inlet passageway and a water outlet passageway for conveying the water entering the inlet passageway out of the outlet chamber through the water outlet passageway,
    water valve control means secured in the water inlet passageway for controlling the volume of water flow into the outlet chamber,
    manually controllable means secured to the body for controlling the water valve control means to thereby control the quantity of water flow into the outlet chamber for controlling the output pressure of the water exiting from the outlet chamber, the manual means being adjusted for normally maintaining a preselected maximum pressure of water flow out the outlet chamber,
    said water valve control means including a valve body having a stepped bore extending therethrough,
    a sapphire ring mounted in the larger bore of the valve body,
    means secured to the stepped bore for securing said ring against the inner wall of the bore, said means having a longitudinal passageway coaxial with the stepped bore for passing water therethrough,
    a sapphire ball mounted on the opposite side of the inner wall of the bore and engaging the ring for coaction therewith,
    means mounted in the bore for resiliently urging the sapphire ball against the sapphire ring, and
    means mounted in the bore and extending through said longitudinal passageway of the securing means for urging the ball away from the ring, said means for urging the ball away from the ring includes an element that engages the ball that is constructed of sapphire, the water to be sampled flows into the water pressure regulator through the valve body from the ball side of the bore, past the ball and through said longitudinal passageway and the bore into the outlet chamber and out through the outlet passageway, said manual adjustable means including diaphragm means positioned in the water outlet chamber for responding to the pressure build-up in the outlet chamber and the changes in pressure for automatically responding thereto for varying the initial adjustment thereof for causing said water valve control means to respond to the changes in the adjustment of the diaphragm means to cause the water valve control means to automatically adjust for maintaining the water pressure downstream of the water pressure regulator essentially constant.

2. A water pressure regulator as defined in claim 1 wherein said ball engaging element is a sapphire pin positioned in said longitudinal passageway and said means for urging the ball away from the ring includes a resilient strip secured to the valve body for retaining the inner end of the sapphire pin in engagement with the sapphire ball.

3. A water pressure regularor as defined in claim 1 including a gasket mounted between the sapphire ring and the inner wall of the bore, the enlarged end of the stepped bore being threaded with the securing means having its outer surface at least partially threaded for coaction with the threaded section of the bore for clamping the gasket and sapphire ring against the inner wall of the bore.

4. A water pressure regulator as defined in claim 3 wherein said means for resiliently urging the ball against the ring is a spring mounted in the bore and secured to the valve body.

* * * * *